(12) United States Patent
Shinpuku et al.

(10) Patent No.: US 7,783,027 B2
(45) Date of Patent: Aug. 24, 2010

(54) COMPUTER-READABLE RECORDING MEDIUM HAVING RECORDED THEREIN AGENT TRAINING SUPPORT PROGRAM, AND AGENT TRAINING SUPPORT METHOD AND AGENT TRAINING SUPPORT APPARATUS

(75) Inventors: Satoshi Shinpuku, Kawasaki (JP); Yusuke Komaba, Kawasaki (JP); Takashi Yanase, Kawasaki (JP); Hideki Yamanaka, Kawasaki (JP); Sachiko Onodera, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1031 days.

(21) Appl. No.: 11/510,971

(22) Filed: Aug. 28, 2006

(65) Prior Publication Data
US 2007/0263840 A1 Nov. 15, 2007

(30) Foreign Application Priority Data
Apr. 17, 2006 (JP) .............................. 2006-112889

(51) Int. Cl.
*H04M 3/00* (2006.01)
(52) U.S. Cl. ............................. 379/265.05; 379/265.06; 379/265.07; 379/265.11; 379/265.12
(58) Field of Classification Search ............ 379/265.05, 379/265.06, 265.07, 265.11, 265.12; 705/8, 705/11; 706/46; 707/100
See application file for complete search history.

(56) References Cited

U.S. PATENT DOCUMENTS

| | | | | |
|---|---|---|---|---|
| 6,128,380 A * | 10/2000 | Shaffer et al. | .......... | 379/265.01 |
| 6,700,971 B1 * | 3/2004 | Cohen et al. | ........... | 379/265.06 |
| 7,386,467 B2 * | 6/2008 | Eitel et al. | ..................... | 705/11 |
| 2003/0002653 A1 * | 1/2003 | Uckun | .................... | 379/266.06 |
| 2003/0187723 A1 * | 10/2003 | Hadden et al. | ................. | 705/11 |
| 2003/0229529 A1 * | 12/2003 | Mui et al. | ....................... | 705/8 |
| 2006/0026179 A1 * | 2/2006 | Brown et al. | ................. | 707/100 |
| 2006/0233346 A1 * | 10/2006 | McIlwaine et al. | ..... | 379/265.02 |
| 2006/0256953 A1 * | 11/2006 | Pulaski et al. | .......... | 379/265.06 |
| 2007/0019801 A1 * | 1/2007 | Brenneman et al. | .... | 379/265.11 |
| 2007/0025528 A1 * | 2/2007 | Knott et al. | .............. | 379/32.01 |
| 2007/0206768 A1 * | 9/2007 | Bourne et al. | .......... | 379/265.01 |

FOREIGN PATENT DOCUMENTS

JP  11-239220  8/1999

* cited by examiner

*Primary Examiner*—Curtis Kuntz
*Assistant Examiner*—Phung-Hoang J Nguyen
(74) *Attorney, Agent, or Firm*—Greer, Burns & Crain, Ltd.

(57) ABSTRACT

A computer-readable recording medium having recorded therein agent training program in which when each agent has been performing an answer, agent identifier, and enquiry contents and contents of the answer are stored in a storage device. An enquiry pattern is extracted from enquiry contents. Respective agents' answers are evaluated, for each enquiry pattern, and by a model contents of the answer extraction section, contents of the answer of an agent with highest evaluation is extracted as model contents of the answer. The contents of the answer of a trainee agent and model contents of the answer are divided into predetermined phases, and corresponding phase of both are mutually compared to calculate ineptitude-degrees in respective phases of trainee agent. By specifying from the model contents of the answer, a range of contents of the answer containing therein at least one of the phases where the ineptitude-degree is high, and lasting predetermined time, and generating teaching material with these contents, teaching material specialized for the inept answers of respective agents is provided, and agent training support performed.

16 Claims, 26 Drawing Sheets

FIG.2

| ANSWER ID | ENQUIRY CONTENTS ||||| ANSWER TIME | ANSWER VOICE | ANSWER IMAGE |
|---|---|---|---|---|---|---|---|---|
| | AGENT ID | CUSTOMER SEX | CUSTOMER AGE | OBJECT | PROBLEM POINTS | | | |
| ID001000 | AGENT A | MALE | IN SIXTIES | PC | CANNOT SEND/RECEIVE MAIL | 15:30 | 001002.mp3 | 001002.mpg |
| ID001001 | AGENT D | MALE | IN THIRTIES | PC | CANNOT SEND MAIL | 15:30 | 001202.mp3 | 001202.mpg |
| ID001002 | AGENT B | FEMALE | IN TWENTIES | PRINTER | PRINTER BLURS WHEN PRINTING | 19:24 | 001133.mp3 | 001133.mpg |
| ... | ... | ... | ... | ... | ... | ... | ... | ... |

FIG.3

| ENQUIRY PATTERN ID | ENQUIRY CONTENTS |
|---|---|
| PID000001 | CUSTOMER (SEX): MALE<br>CUSTOMER (AGE): IN SIXTIES<br>OBJECT: PC<br>PROBLEM POINT: CANNOT SEND/RECEIVE MAIL |
| PID000002 | CUSTOMER (SEX): MALE<br>CUSTOMER (AGE): IN THIRTIES<br>OBJECT: PC<br>PROBLEM POINT: CANNOT SEND MAIL |
| PID000003 | CUSTOMER (SEX): FEMALE<br>CUSTOMER (AGE): IN TWENTIES<br>OBJECT: PRINTER<br>PROBLEM POINT: BLURS WHEN PRINTING |
| ... | ... |

FIG.4

| AGENT ID | ENQUIRY PATTERN ID | AVERAGE ANSWER TIME | NUMBER OF ANSWERS |
|---|---|---|---|
| AGENT A | PID000001 | 25:02 | 8 |
| AGENT D | PID000002 | 22:01 | 6 |
| AGENT B | PID000003 | 23:32 | 6 |
| ... | ... | ... | ... |

FIG.5

| AGENT ID | ENQUIRY PATTERN ID: PID000001 EVALUATION VALUE | ENQUIRY PATTERN ID: PID000002 EVALUATION VALUE | ... |
|---|---|---|---|
| AGENT A | −0.75 | −0.6 | |
| AGENT B | 1.25 | 1.13 | |
| ... | | ... | ... |

FIG.6

| AGENT ID | ENQUIRY PATTERN ID: ID000001<br>ANSWER ID FOR REPRESENTATIVE CONTENTS OF ANSWER | ENQUIRY PATTERN ID: ID000002<br>ANSWER ID FOR REPRESENTATIVE CONTENTS OF ANSWER | ... |
|---|---|---|---|
| AGENT A | ID001413 | ID001455 | |
| AGENT B | ID001252 | ID001233 | |
| ... | ... | ... | ... |

FIG.7

| TRAINEE AGENT ID | ENQUIRY PATTERN ID | ANSWER ID OF REPRESENTATIVE CONTENTS OF ANSWER |
|---|---|---|
| AGENT A | PID000001 | ID001413 |
| AGENT A | PID000002 | ID001455 |
| ⋮ | ⋮ | ⋮ |

FIG.8

| TRAINEE AGENT ID | ENQUIRY PATTERN ID | ANSWER ID OF MODEL CONTENTS OF ANSWER |
|---|---|---|
| AGENT A | PID0000001 | ID001252 |
| AGENT A | PID0000002 | ID001233 |
| ... | ... | ... |

FIG.9

| SPEAKER | KEY WORD | PHASE PROBABILITY: HEARING | PHASE PROBABILITY: CLASSIFICATION | PHASE PROBABILITY: RETRIEVING | PHASE PROBABILITY: ANSWERING |
|---|---|---|---|---|---|
| AGENT | WHAT DID YOU DO | 0.6 | 0.2 | 0.1 | 0.1 |
| CUSTOMER | SO, I PUSH | 0.5 | 0.4 | 0.1 | 0.1 |
| CUSTOMER | YEAH | 0.2 | 0.3 | 0.1 | 0.4 |
| ... | ... | ... | ... | ... | ... |

FIG.10

| CHARACTERISTIC | CORRESPONDING PHASE: HEARING | CORRESPONDING PHASE: CLASSIFICATION | CORRESPONDING PHASE: RETRIEVING | CORRESPONDING PHASE: ANSWERING |
|---|---|---|---|---|
| CONTAINED WITHIN 20 PERCENT FROM INITIAL CORRESPONDENCE | 0.8 | 0.15 | 0.05 | 0.0 |
| CONTAINED WITHIN 20 PERCENT FROM INITIAL CORRESPONDENCE | 0.05 | 0.1 | 0.15 | 0.7 |
| FINISHED BY AGENT VOICE RISING PITCH | 0.4 | 0.35 | 0.15 | 0.1 |
| FINISHED BY PREVIOUS AGENT VOICE RISING PITCH | 0.35 | 0.3 | 0.2 | 0.15 |
| ... | ... | ... | ... | ... |

FIG.11

| TRAINEE AGENT ID | ENQUIRY PATTERN ID | MODEL ANSWER VOICE | MODEL ANSWER IMAGE | INEPTITUDE DEGREE INFORMATION |
|---|---|---|---|---|
| AGENT A | PID000001 | 001252.mp3 | 001252.mpg | 001252.xml |
| AGENT A | PID000002 | 001233.mp3 | 001233.mpg | 001233.xml |
| ... | ... | ... | ... | ... |

FIG.12

| TRAINEE AGENT ID | ENQUIRY PATTERN ID | AVERAGE INEPTITUDE DEGREE | TEACHING MATERIAL | | |
|---|---|---|---|---|---|
| | | | TELOP | VOICE OF TEACHING MATERIAL | IMAGE OF TEACHING MATERIAL |
| AGENT A | PID000001 | 1.25 | 001252.txt | 001252.mp3 | 001252.mpg |
| AGENT A | PID000002 | 1.11 | 001233.txt | 001233.mp3 | 001233.mpg |
| ... | ... | ... | ... | ... | ... |

FIG.20

| TRAINEE AGENT ID | DAY OF WEEK | TIME ZONE | OPERATING RATIO |
|---|---|---|---|
| AGENT A | MONDAY | 10:00 | 0.5 |
| AGENT A | MONDAY | 10:30 | 0.45 |
| ... | ... | ... | ... |

FIG.21

| TRAINEE AGENT ID | ENQUIRY PATTERN ID: PID00000001 EVALUATION VALUE | ENQUIRY PATTERN ID: PID00000002 EVALUATION VALUE | ... |
|---|---|---|---|
| AGENT A | −0.82 | −0.63 | ... |
| AGENT B | 1.05 | 1.11 | ... |
| ... | ... | ... | ... |

FIG.22

| TRAINEE AGENT ID | ENQUIRY PATTERN ID: PID000001 TEACHING MATERIAL OUTPUT FREQUENCY | ENQUIRY PATTERN ID: PID000002 TEACHING MATERIAL OUTPUT FREQUENCY | ... |
|---|---|---|---|
| AGENT A | 4 | 2 | ... |
| AGENT B | 1 | 1 | ... |
| ... | ... | ... | ... |

FIG.23

| TRAINEE AGENT ID | ENQUIRY PATTERN ID: PID00000001 TRAINING EFFECTIVENESS | ENQUIRY PATTERN ID: PID00000002 TRAINING EFFECTIVENESS | ... |
|---|---|---|---|
| AGENT A | 3.22 | 2.12 | ... |
| AGENT B | 1.21 | 0.81 | ... |
| ... | ... | ... | ... |

COMPUTER-READABLE RECORDING MEDIUM HAVING RECORDED THEREIN AGENT TRAINING SUPPORT PROGRAM, AND AGENT TRAINING SUPPORT METHOD AND AGENT TRAINING SUPPORT APPARATUS

BACKGROUND OF THE INVENTION

1. Field of the Invention

The present invention relates to a technique for performing agent training support, by providing teaching material which can individually train an agent at a contacting center, using a computer.

2. Description of the Related Art

In recent contacting centers, under a background of an increase in the turnover rate, the liquidity of agent is high. Therefore, there is a demand to efficiently training agents to a high level of proficiency, at low cost. Consequently, in Japanese Unexamined Patent Publication No. 11(1999)-239220, technology is proposed where an agent with a high proficiency answers the telephone from a customer, while an agent with a low proficiency can listen to contents of the conversations on a telephone. By means of this proposed technology, while providing an answering service by an agent for a customer, at the same time training of an agent with a low proficiency can be performed.

However, in the technology of the aforementioned proposal, an agent with a low proficiency who is the target of the training must listen to the answer of the agent with a high proficiency, without any relation to whether the answering are those for which they are skilled or those for which they are not skilled. Therefore, it is not possible to train with emphasis on the contents of the answer for which the respective agents are unskilled, and hence the training efficiency is poor.

Consequently, the present invention takes into consideration the above conventional problems to provide technology to enable training with emphasis on the contents of the answer for which the respective agents are unskilled, to thereby enable efficient training of the agent.

SUMMARY OF THE INVENTION

Therefore, in accordance with the present invention, when each agent has been performing an answer, respectively, in a contacting center, an agent identifier, enquiry contents, and contents of the answer are associated with one another, and sequentially stored in a storage device. Furthermore, for each of enquiry patterns that are extracted from the enquiry contents according to a predetermined rule, evaluation of the answers of each agent is executed, based on the agent identifiers and the contents of the answer, and the contents of the answer of an agent with the highest evaluation are extracted as model contents of the answer. Next, for each enquiry pattern, the model contents of the answer and the contents of the answer of an trainee agent is divided into predetermined phases of utterance, and corresponding phases are mutually compared, and degree of ineptitudes (hereinafter, referred to as "ineptitude-degree") in the respective phases of the trainee agents are calculated. Then, for each enquiry pattern, from the model contents of the answer, a range of contents of the answer containing therein at least one of the phases where the ineptitude-degree is high, and lasting predetermined time, is specified, and teaching material for training the trainee agents is generated using these contents. Therefore, special teaching material for the contents where the trainee agent is unskilled are generated individually for each trainee agent, for each answer pattern, and hence it is possible to give emphasized individual training of the trainee agent for the unskilled contents. Consequently, agent training efficiency can be improved.

In accordance with one aspect of the present invention, there is provided a computer-readable recording medium having recorded therein an agent training support program for executing on a computer the steps for: associating an agent identifier, and enquiry contents and contents of the answer, to sequentially store these in a storage device, when each agent has been performing an answer in a contacting center; extracting an enquiry pattern from the enquiry contents; executing evaluation of the answers of each agent based on the agent identifier and the contents of the answer, for each said enquiry pattern; extracting the contents of the answer of an agent with a highest said evaluation as model contents of the answer, for each said enquiry pattern; dividing the model contents of the answer and the contents of the answer of a trainee agent into predetermined phases, for each said enquiry pattern; executing mutual comparison of corresponding phases of said model contents of the answer and said contents of the answer of a trainee agent, to calculate ineptitude-degrees in the respective phases of the trainee agent, for each said enquiry pattern; specifying from said model contents of the answer, a range of a contents of the answer containing therein at least one of the phases where said ineptitude-degree is high, and lasting predetermined time, for each said enquiry pattern; and generating teaching material for training the trainee agent, using said model contents of the answer for the range of said predetermined time.

In accordance with another aspect of the present invention, there is provided an agent training support method for executing in sequence on a computer, comprising the steps for: associating an agent identifier, and enquiry contents and contents of the answer, to sequentially store these in a storage device, when each agent has been performing an answer in a contacting center; extracting an enquiry pattern from the enquiry contents; executing evaluation of the answers of each agents, based on the agent identifier and the contents of the answer, for each said enquiry pattern; extracting the contents of the answer of an agent with a highest evaluation as model contents of the answer, for each said enquiry pattern; dividing the model contents of the answer and the contents of the answer of a trainee agent into predetermined phases, for each said enquiry pattern; executing mutual comparison of corresponding phase of the model contents of the answer and the contents of the answer of a trainee agent, to calculate ineptitude-degrees in the respective phases of the trainee agent, for each said enquiry pattern; specifying from said model contents of the answer, a range of a contents of the answer predetermined time containing therein at least one of the phases where said ineptitude-degree is high, and lasting predetermined time, for each said enquiry pattern; and generating teaching material for training the trainee agent, using the model contents of the answer for the range of the predetermined time.

In accordance with further aspect of the present invention, there is provided an apparatus for supporting training of an agent, the apparatus suitable for operation associated with a computer, comprising: means for associating and sequentially storing agent identifier, enquiry contents and contents of the answer, when an answer has been being performed by each agent in a contacting center; means for extracting an enquiry pattern from the enquiry contents; means for executing evaluation of the answers of each agent based on the agent identifier and the contents of the answer, for each said enquiry pattern; means for extracting the contents of the answer of an agent with a highest evaluation as model contents of the answer, for each said enquiry pattern; means for dividing said model contents of the answer and said contents of the answer of a trainee agent into predetermined phases, for each said enquiry pattern; means for mutually comparing corresponding phase of the model contents of the answer and the contents of the answer of a trainee agent, and calculating ineptitude-degrees in respective phases of the trainee agent, for each said enquiry pattern; means for specifying from said model contents of the answer, a range of a contents of the answer predetermined time containing therein at least one of the phases where said ineptitude-degree is high, and lasting predetermined time, for each said enquiry pattern; and means for generating teaching material for training the trainee agent, using the model contents of the answer for the range of the predetermined time.

Other objects and features and advantages of the present invention will become more apparent from the ensuing description of preferred embodiments thereof, in the accompanying drawings.

BRIEF DESCRIPTION OF THE DRAWINGS

FIG. 2 is an explanatory drawing of an answer database.

FIG. 3 is an explanatory drawing of an enquiry pattern database.

FIG. 4 is an explanatory drawing of an enquiry pattern dependent answer database.

FIG. 5 is an explanatory drawing of an evaluation list database.

FIG. 6 is an explanatory drawing of a representative answer database.

FIG. 7 is an explanatory drawing of a trainee answer database.

FIG. 8 is an explanatory drawing of a model answer database.

FIG. 9 is an explanatory drawing of a key word database.

FIG. 10 is an explanatory drawing of a rule database.

FIG. 11 is an explanatory drawing of a model answer with ineptitude-degree database.

FIG. 12 is an explanatory drawing of a teaching material database.

FIG. 20 is an explanatory drawing of an operating ratio database.

FIG. 21 is an explanatory drawing of a past evaluation value database.

FIG. 22 is an explanatory drawing of a training performance database.

FIG. 23 is an explanatory drawing of a training effectiveness database.

DESCRIPTION OF THE PREFERRED EMBODIMENTS

Hereunder is a detailed description of the invention, with reference to the accompanying drawings.

Figure 1:
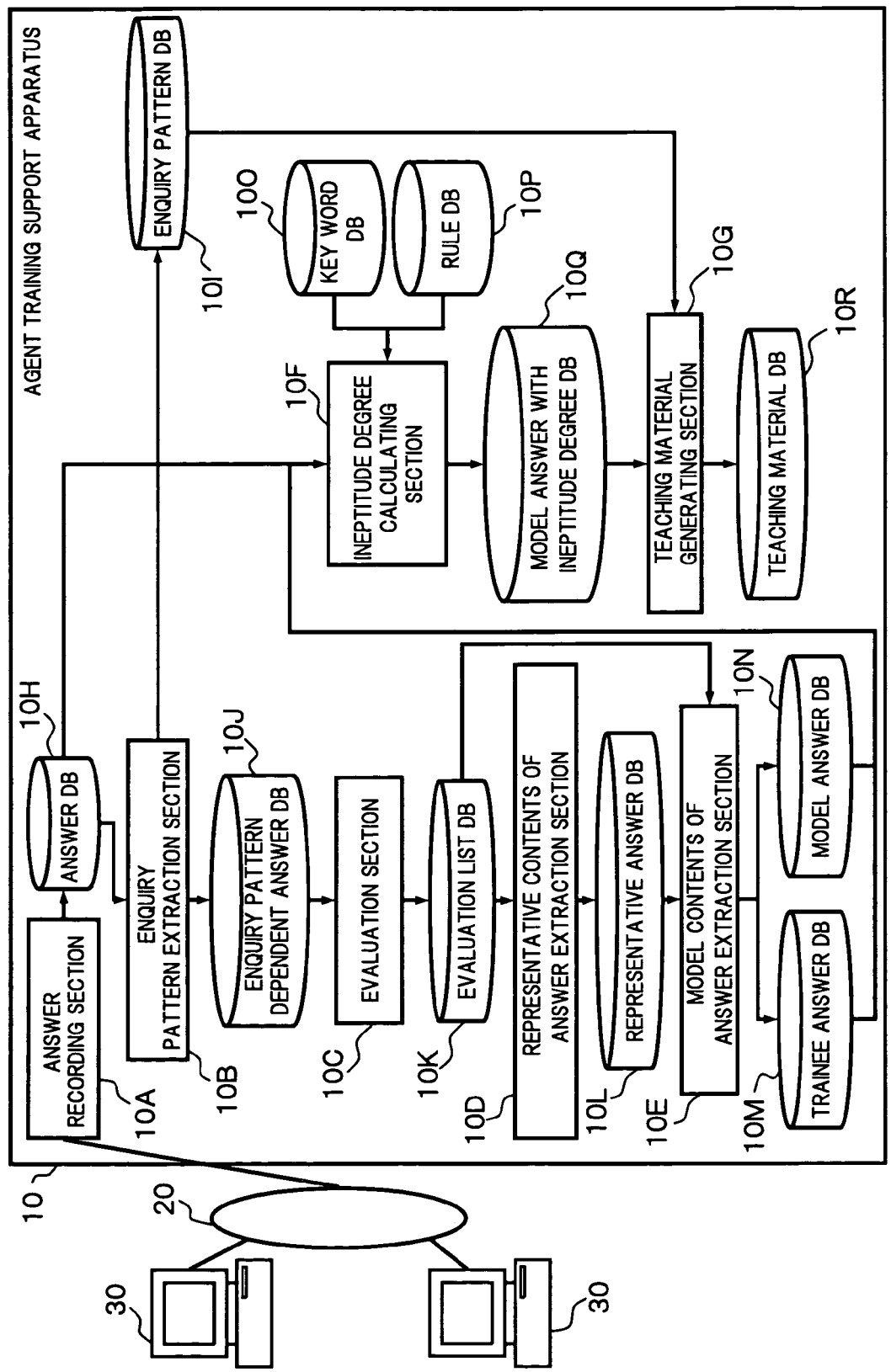
FIG. 1 is an overall block diagram of an agent training support apparatus of a first embodiment.

FIG. 1 shows a first embodiment of an agent training support apparatus according to the present invention.

The agent training support apparatus 10 is one which supports training of an agent who performs answering at a contacting center using a telephone or the like. It is constructed on a computer comprising at least a central processing unit (CPU) and a memory. Furthermore, an agent training support program recorded on a computer-readable recording medium such as a CD-ROM, or a DVD-ROM, is installed on the computer, and by executing the agent training support program loaded to the memory, an answer recording section 10A, an enquiry pattern extraction section 10B, an evaluation section 10C, a representative contents of the answer extraction section 10D, a model contents of the answer extraction section 10E, an ineptitude-degree calculating section 10F, and a teaching material generating section 10G are individually executed. Furthermore, the agent training support apparatus 10 comprises: an answer database (DB) 10H; an enquiry pattern DB 10I; answer DB 10J which is dependent on the enquiry pattern (hereinafter, referred to as "an enquiry pattern dependent answer DB 10J"); an evaluation list DB 10K; a representative answer DB 10L; a trainee answer DB 10M; a model answer DB 10N; a key word DB 100; a rule DB 10P; a model-answer-with-ineptitude-degree DB 10Q; and a teaching material DB 1R. Moreover, the agent training support apparatus 10 is mutually connected to agent terminals 30 being computer terminals which an agent operates via a network 20 being a communication means, to thereby perform data transmission and reception. Furthermore, the agent training support apparatus 10 is connected to an automatic call distributor (ACD) (not shown in the figure) which distributes incoming calls in the contacting center, to the respective agent terminals 30, and called status and operating ratios of each agent are acquired from the ACD. The configuration where the telephone and the computer are combined in this way, is realized using computer telephony integration (CTI) technology.

The answer recording section 10A functions as a step and a means for associating the agent identifiers, and the enquiry contents and the contents of the answer, and storing inquiry contents and contents of the answer. When the agent performs an answer, an agent identifier which identifies the agent making the answer, the enquiry contents and the contents of the answer, a voice and image representing the contents of the answer, and a log in which the key operation and screen transition of the agent terminal 30 is recorded, are associated and stored in the storage device. The enquiry pattern extraction section 10B functions as a step and a means for extracting the enquiry pattern, and based on enquiry contents in which is contained information related to the customer making the enquiry, and information related to the enquiry purpose, extracts an enquiry pattern following predetermined rules. These predetermined rules are ones which categorize the enquiry contents based on a previously determined standard such as for example the sex or age of the customer making the enquiry, the object of the enquiry, or the problem point of the enquiry purpose. The evaluation section 10C functions as a step and means for evaluating the enquiry, and performs an evaluation of answers of the respective agents for each enquiry pattern. The representative contents of the answer extraction section 10D calculates the average answer time of the respective agents, and from amongst the contents of the answer for each of the agents, extracts the one which is closest to the average answer time as a representative answer content, for each enquiry pattern. The model contents of the answer extraction section 10E functions as a step and means for extracting the contents of the answer of the agent as a model answer content, and for each enquiry pattern, extracts the representative answer content of the agent with the highest evaluation, as the model answer content. Furthermore, the ineptitude-degree-calculating section 10F functions as a step and means for dividing the contents of the answer into predetermined phases, and as a step and means for calculating the ineptitude-degree, and for each enquiry pattern, calculates the ineptitude-degree of the trainee agent for respective phases in the contents of the answer. The teaching material generating section 10G functions as a step and means for specifying a range, and as a step and means for generating teaching material, and from the model contents of the answer, specifies a range of contents of the answer containing therein at least a part of the phase for which the trainee agent is unskilled, and lasting predetermined time, and generates teaching material for training the trainee agent using the contents of this range.

The answer DB 10H is stored the agent ID serving as the agent identifier, the enquiry contents and the contents of the answer, a voice and image representing the contents of the answer, and a log in which the key operation and the screen transition of the agent terminal 30. As shown in FIG. 2, a record is formed by including: an answer ID which identifies the respective answers; an agent ID; the sex and age of the customer, and the enquiry object and problem points for the enquiry object, as the enquiry contents; the time during the contents of the answering; and the voice during the contents of the answer and the movie during contents of the answer. The enquiry pattern DB 10I is stored information which defines the enquiry pattern. As shown in FIG. 3, a record is formed by including an enquiry pattern ID which defines the enquiry pattern, and the enquiry contents. The enquiry pattern dependent answer DB 10J is stored the average answer time of the respective agents, for each enquiry pattern. As shown in FIG. 4, a record is formed by including the agent ID, the enquiry pattern ID, the average answer time, and the number of answers which is used for calculation of the average answer time. The evaluation list DB 10K is stored an evaluation value showing an evaluation of the answers for each agents and each enquiry pattern. As shown in FIG. 5, a record is formed by including the agent ID, and an evaluation value for each enquiry pattern. The representative answer DB 10L is stored representative contents of the answer of the respective agents, for each enquiry pattern. As shown in FIG. 6, a record is formed by including the agent ID, and the answer ID for the representative contents of the answer of the respective enquiry patterns. The trainee's answer DB 10M is stored the representative contents of the answer of the respective trainee agents, for each enquiry pattern. As shown in FIG. 7, a record is formed by including the trainee agent ID showing the agent ID of the trainee agent, the enquiry pattern ID, and the answer ID of the representative contents of the answer. The model answer DB 10N is stored the model contents of the answer for each enquiry pattern are associated with the respective trainee agents. As shown in FIG. 8, a record is formed by including the trainee agent ID, the enquiry pattern ID, and the answer ID of the model contents of the answer. The key word DB 10O is stored, by the wordspotting method for the speech voice recognition, key words which become a standard for specifying predetermined phases to which the utterance from the voice of the contents of the answer belongs, and a probability which shows that there is a high probability that this key word is contained in a certain phase. As shown in FIG. 9, a record is formed by including the speaker, the key word, and the probabilities of the respective phases. In the embodiment to the present invention, the predetermined phases are assumed to be four types, namely; "hearing", "classification", "retrieving", and "answering". However, the types are not limited to the above. The rule DB 10P is stored, following a rule based on the heuristics, the characteristics which becomes the standard for specifying the predetermined phase to which the utterance belongs, from the characteristics of the contents of the answer, and a probability showing that there is a high probability that the characteristic which becomes the standard is contained in a certain phase. As shown in FIG. 10, a record is formed by including the characteristic, and the probabilities of the respective phases. The model-answer-with-ineptitude-degree DB 10Q is stored information necessary for extracting the contents for where the trainee agent is inept, from the model contents of the answer stored in the model answer DB 10N. As shown in FIG. 11, a record is formed by including; the trainee agent ID, the enquiry pattern ID, the model answer voice and model answer image, and the ineptitude-degree information. The ineptitude-degree information is information which is recorded in a text file, and which shows the ineptitude-degree of the trainee agent in the respective phases of the model contents of the answer. The teaching material DB 10R is stored teaching material generated based on the ineptitude-degree and the model contents of the answer, for each phase of the trainee agent. As shown in FIG. 12, a record is formed by including ; the trainee agent ID, the enquiry pattern ID, the average ineptitude-degree, a telop in which is shown the enquiry contents and the like, and teaching material voices and teaching material images. The average ineptitude-degree is an average value of the ineptitude-degree of the phases in a range of the model contents of the answer lasting for a predetermined time used as teaching material.

Figure 13:
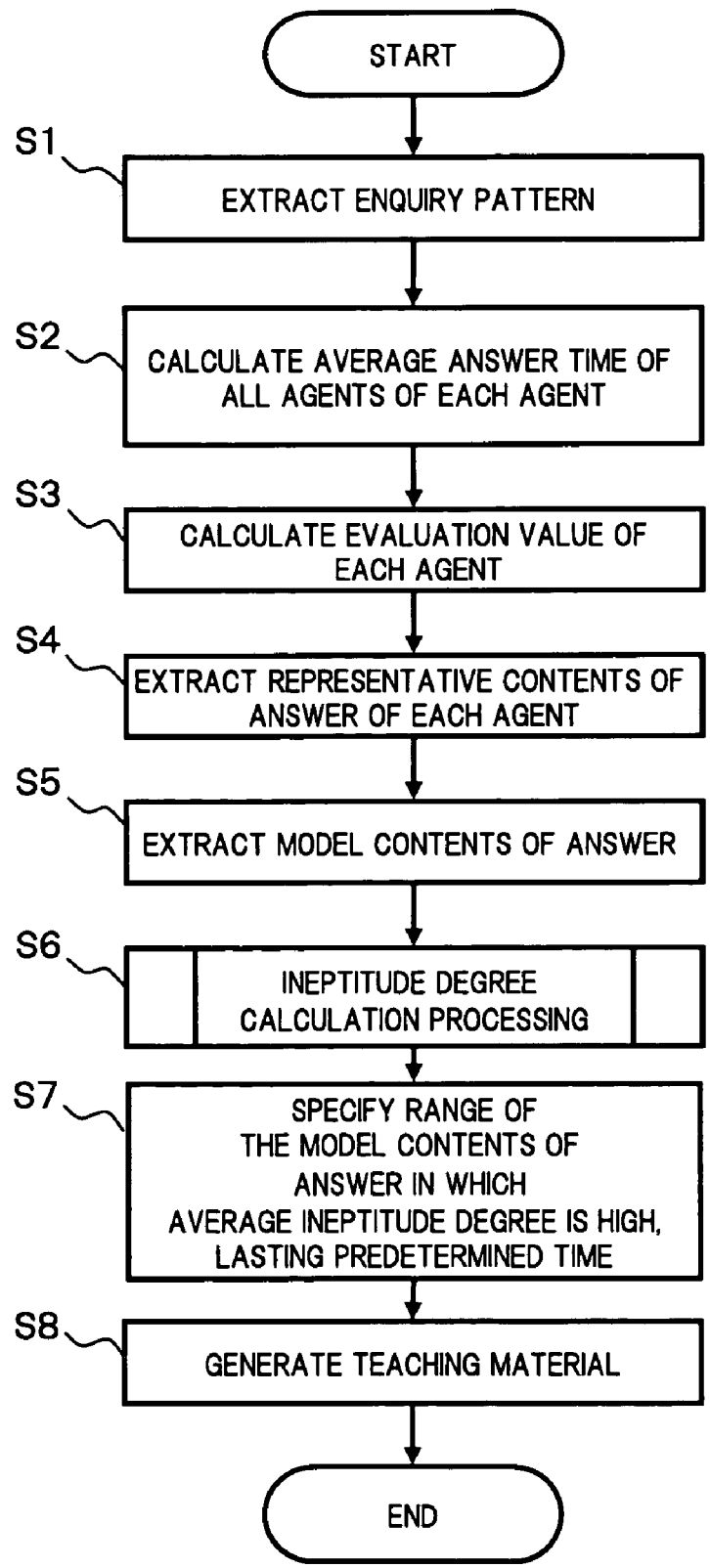
FIG. 13 is a flow chart of teaching material generating processing of a first embodiment.

FIG. 13 shows teaching material generation processing which is executed by the enquiry pattern extraction section 10B, the evaluation section 10C, the representative contents of the answer extraction section 10D, the model contents of the answer extraction section 10E, the ineptitude-degree calculation section 10F, and the teaching material generating section 10G of the agent training support apparatus 10. This processing is executed for each predetermined time.

In step 1 (abbreviated to S1 in the drawings and similarly for a following steps), the answer DB 10H is referred to, and an enquiry pattern is extracted according to a predetermined rule, from the enquiry contents. Then the enquiry pattern DB 10I is referred to, and when the extracted enquiry pattern exists in the enquiry pattern DB 10I, the enquiry pattern ID is extracted. While the extracted enquiry pattern does not exist in the enquiry pattern DB 10I, an enquiry pattern ID is allotted, and this is stored in the enquiry pattern DB 10I. The process of step 1 corresponds to a step of and means for extracting the enquiry pattern.

In step 2, the answer time of the answer DB 10H is referred to, and the average answer time of the respective agents is calculated for each enquiry pattern. Furthermore, the calculated average answer time, and the number of answers used for calculating this average answer time, are stored in the enquiry pattern dependent answer DB 10J. Moreover, the average answer time for all of the agents is calculated, for each enquiry pattern.

In step 3, the evaluation value for the respective agents is calculated for each enquiry pattern. As the evaluation value calculation method, there is for example a calculation method where the average answer time of the respective agents is extracted from the enquiry pattern dependent answer DB 10J, and a value for where the average answer time of the respective agents is subtracted from the average answer time of all of the agents, is divided by the variance of the average answer times of all the agents. Furthermore, the evaluation value is stored in the evaluation list DB 10K. The processing of step 3 corresponds to the step and means for evaluating the answer.

In step 4, the average time for each answer of the respective agents is extracted from the enquiry pattern dependent answer DB 10J, for each enquiry pattern. Furthermore, for each enquiry pattern, amongst the contents of the answer of the respective agents, the contents of the answer for the answer time which is closest to the average answer time, is extracted from the answer DB 10H, as the representative contents of the answer of the respective agents. Moreover, the answer ID of the representative contents of the answer is stored in the representative answer DB 10L. when there is a plurality of contents of the answer for the answer time which is closest to the average answer time, one contents of the answer can be extracted according to a previously determined rule, such as to extract either one of the shorter or the longer answer time.

In step 5, the evaluation list DB 10K is referred to, and for each enquiry pattern, the agent with the highest evaluation value is specified. Then, the representative contents of the answer of this agent are extracted from the representative answer DB 10L as the model contents of the answer. Furthermore, the answer ID of the representative contents of the answer for the all of the trainee agents is extracted from the representative answer DB 10L, and the answer IDs are stored in the trainee answer DB 10M, for each enquiry pattern. Moreover, for each enquiry pattern, a correspondence is presented between the model contents of the answer and the trainee agent ID of the trainee answer DB 10M, and ten, the model contents of the answer are stored in the trainee answer DB 10M. The processing of step 5 corresponds to a step of and means for extracting the contents of the answer of the agent as the model contents of the answer.

In step 6, a call of a subroutine for ineptitude calculation processing is performed for each trainee agent and for each enquiry pattern in the manner described below. Namely, the model contents of the answer and the representative contents of the answer of the trainee agent are divided into predetermined phases, and calculation of the ineptitude-degree of the trainee agent for the respective phases is executed. Then, an ineptitude-degree information in which the respective phases in the model contents of the answer, and their ineptitude-degree are mutually associated is generated and stored in the model-answer-with-ineptitude-degree DB 10Q.

In step 7, based on the ineptitude-degree information of the trainee agents stored in the model-answer-with-ineptitude-degree DB 10Q by the ineptitude-degree calculation processing, a range of contents of the answer which includes therein at least one part of the phase where the ineptitude-degree of the trainee agent is high, and lasting a predetermined time, is specified from the model contents of the answer. More specifically, from the beginning of the model contents of the answer, the range of a predetermined time is extracted, and the average ineptitude-degree in the range of this predetermined time is calculated using the following equation.

$$\text{Average ineptitude degree} = \frac{\sum(\text{time of each phase included in predetermined time} \times \text{ineptitude degree of each phase})}{\text{predetermined time}}$$

Furthermore, each range for extracting from the model contents of the answer is shifted back for one minute, and the average ineptitude-degree for the respective ranges is calculated. Then, the range in which the average ineptitude-degree is the highest amongst the model contents of the answer is specified. In the case where there is a plurality of ranges where the average ineptitude-degree is highest, then one range can be specified according to a previously determined rule, such as specifying the earliest range or the latest range.

Figure 14:
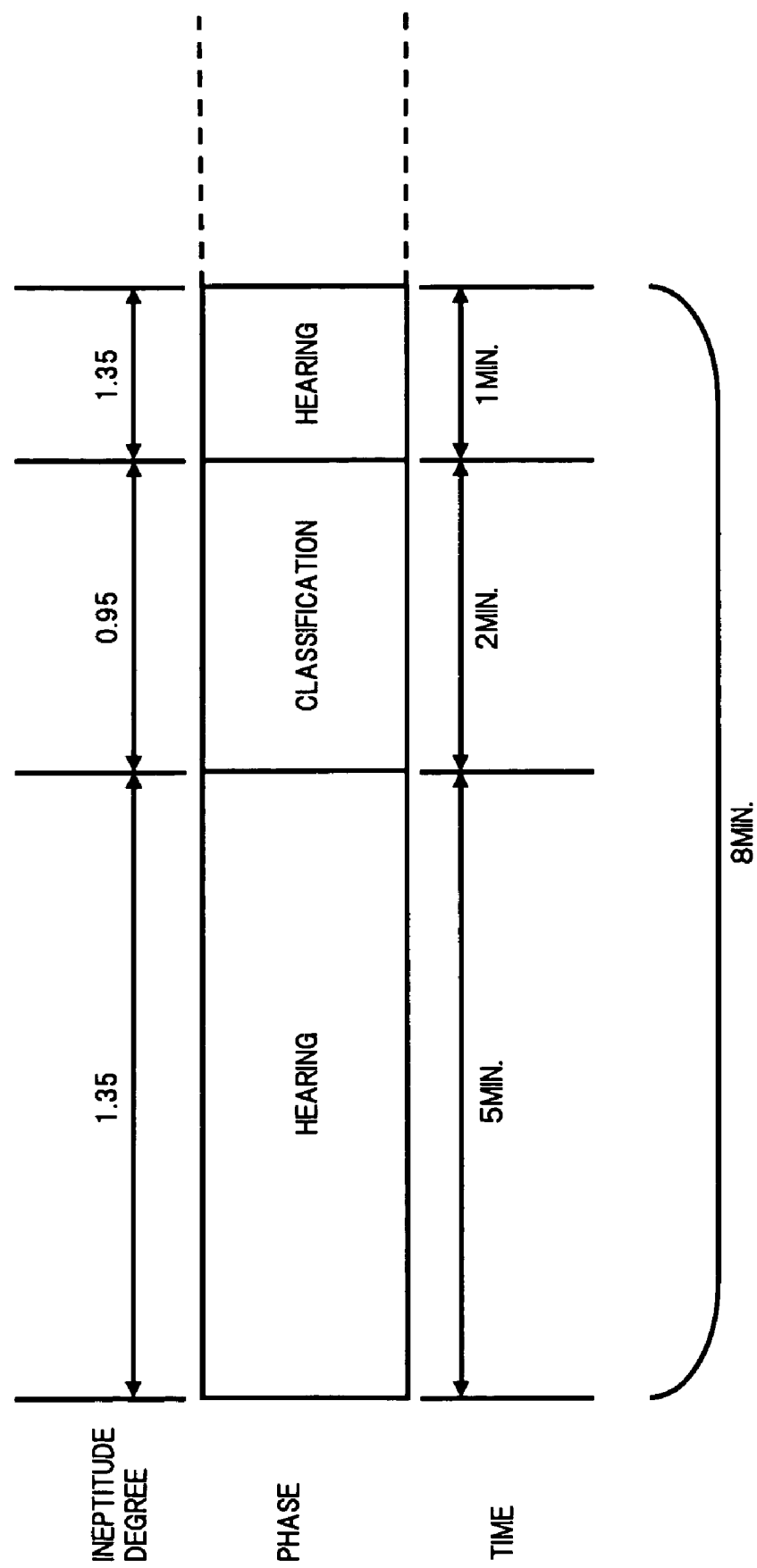
FIG. 14 is an explanatory drawing of ineptitude-degree of each phase in model contents of the answer.

Here the calculation of the average ineptitude-degree will be explained using FIG. 14. For example, in the case where the predetermined time is set to 8 minutes, then the first 5 minutes of the phase which is contained in the model contents of the answer of the extracted 8 minutes is "hearing", the next 2 minutes is "classification", and the next 1 minute is "hearing". Then, the results from referring to the ineptitude-degree information are; ineptitude-degree of the "hearing" of the trainee agent is "1.35", and ineptitude-degree of the "classification" is "0.95". In this case, the average ineptitude-degree is calculated as follows.

$$((5+1)\times 1.35 + 2 \times 0.95)/(5+2+1) = 1.25$$

The processing of step 7 corresponds to the step and means for specifying the range.

Step 8 generates the teaching material. More specifically, the enquiry pattern DB 10I is referred to, and a telop which shows the enquiry contents and the like is generated for each enquiry pattern. Furthermore, for each enquiry pattern, the voice and image information for the range in which the average ineptitude-degree of the trainee agent is the highest amongst the model contents of the answer, is extracted from the model-answer-with-ineptitude-degree DB 10Q, and teaching material of which the telop is overlapped with this image information is generated. Furthermore, the trainee agent ID, the enquiry pattern, the average ineptitude-degree of the trainee agent in the range of contents of the answer lasting the predetermined time specified from the model contents of the answer, and the training material, are associated and stored in the teaching material DB 10R. The processing of step 8 corresponds to the step and means for generating the teaching material.

The teaching material generation processing may be executed when the answering of the respective trainee agents is completed. In this case, it is preferable to perform processing with only the enquiry pattern in the completed answer as the object. Furthermore, the teaching material generation processing may be executed by command input or the like.

Figure 15:
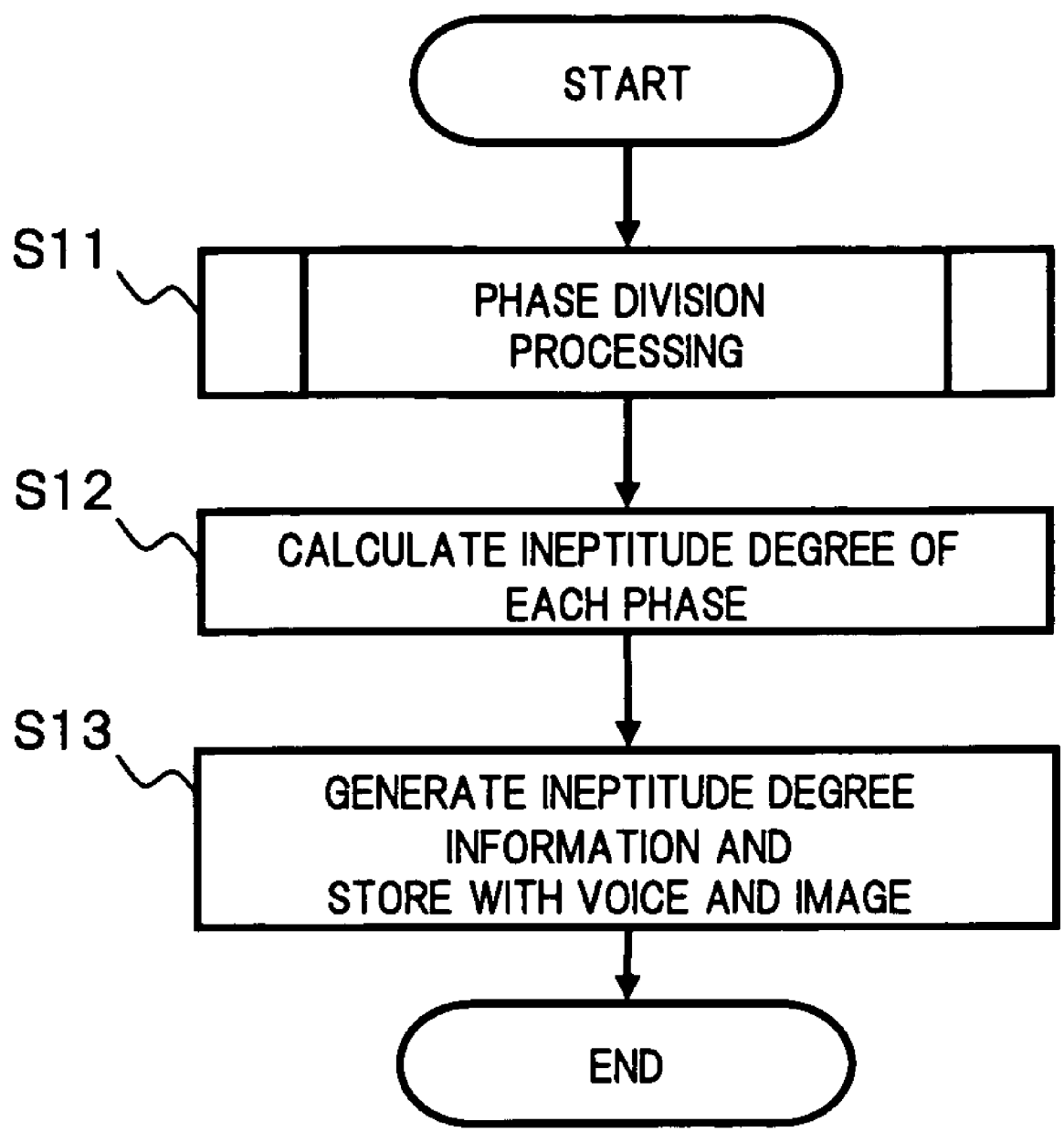
FIG. 15 is a flow chart of ineptitude-degree calculating processing.

FIG. 15 shows the processing contents of a subroutine for ineptitude-degree calculation processing.

In step 11, a subroutine for phase division processing for dividing the representative contents of the answer of the trainee answer DB 10M, and the model contents of the answer of the model answer DB 10N, into each predetermined phase is called. The phase division processing corresponds to the step and means for dividing the contents of the answer into predetermined phases.

In step 12, amongst the phases in the representative contents of the answer of the trainee answer DB 10M and the model contents of the answer of the model answer DB 10N, the corresponding phases are mutually compared, and the ineptitude-degree of the trainee agent in the respective phases is calculated. This ineptitude-degree is calculated by dividing the answer time of the respective phases in the representative contents of the answer of the trainee answer DB 10M, by the answer time of the phase in the model contents of the answer of the model answer DB 10N which corresponds to these phases.

Figure 16:
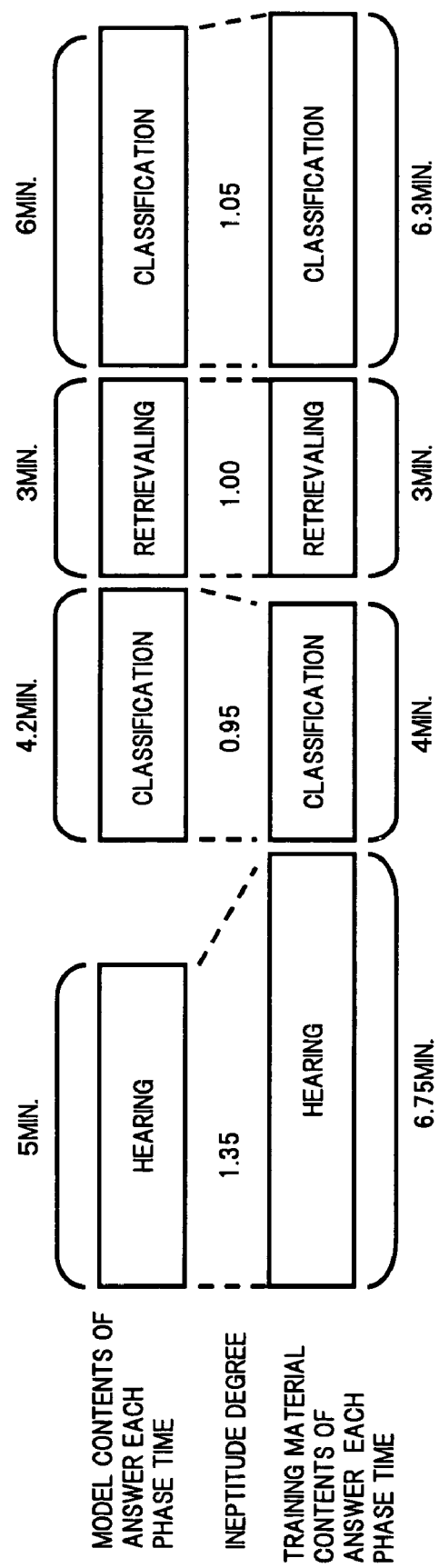
FIG. 16 is an explanatory drawing of an ineptitude-degree calculating method.

Here the method of calculating the ineptitude-degree will be described in detail using FIG. 16. For example, in the case where the time of the phase of the "hearing" in the model contents of the answer of the model answer DB 10N is 5 minutes, and the time of the phase of the "hearing" in the representative contents of the answer of the trainee answer DB 10M is 6.75, the ineptitude-degree in the phase for the trainee agent is 6.75 minutes divided by 5 minutes, get 1.35. Furthermore, similarly when calculating the ineptitude-degree of the phase of the "classification", 4 minutes is divided by 4.2 minutes to get 0.95.

Moreover as another calculation method for the ineptitude-degree, there is a method where, in the representative contents of the answer of the trainee answer DB 10M and the model contents of the answer of the model answer DB 10N, a hesitancy rate where the proportion of the hesitancy in the respective phases is represented by a numerical value, is calculated using speech recognition, and the hesitancy rate of the respective phases in the representative contents of the answer of the trainee answer DB 10M is divided by the hesitancy rate of the phase in the model contents of the answer of the model answer DB 10N corresponding to these phases. Furthermore, focusing on the time until the answer of the agent corresponding to the utterance of the customer making an enquiry, or the proportion of the utterance time between the customer and the agent, then amongst the phases in the representative contents of the answer of the trainee answer DB 10M, and the phases in the model contents of the answer of the model answer DB 10N, the corresponding phases may be mutually compared. The processing of step 12 corresponds to the step and means for calculating the ineptitude-degree.

In step 13, ineptitude-degree information in which the respective phases in the model contents of the answer of the model answer DB 10N, and the ineptitude-degree of the respective phases of the trainee agent are associated, is generated in text format such as XML (extensible Markup Language). Moreover, the answer voice and answer image of the model contents of the answer are extracted from the answer DB 10H, and are stored in the model-answer-with-ineptitude-degree DB 10Q together with the ineptitude-degree information.

Next, the processing contents of the subroutine for the phase division processing are described. In this phase division processing, there are two types, namely first division processing which performs phase division based on the voice of the contents of the answer, and second division processing which performs phase division based on a log in which is recorded the key operation and the screen transition of the agent terminal 30 in the contents of the answer. Phase division may be performed based on both the voice and the log.

Figure 17:
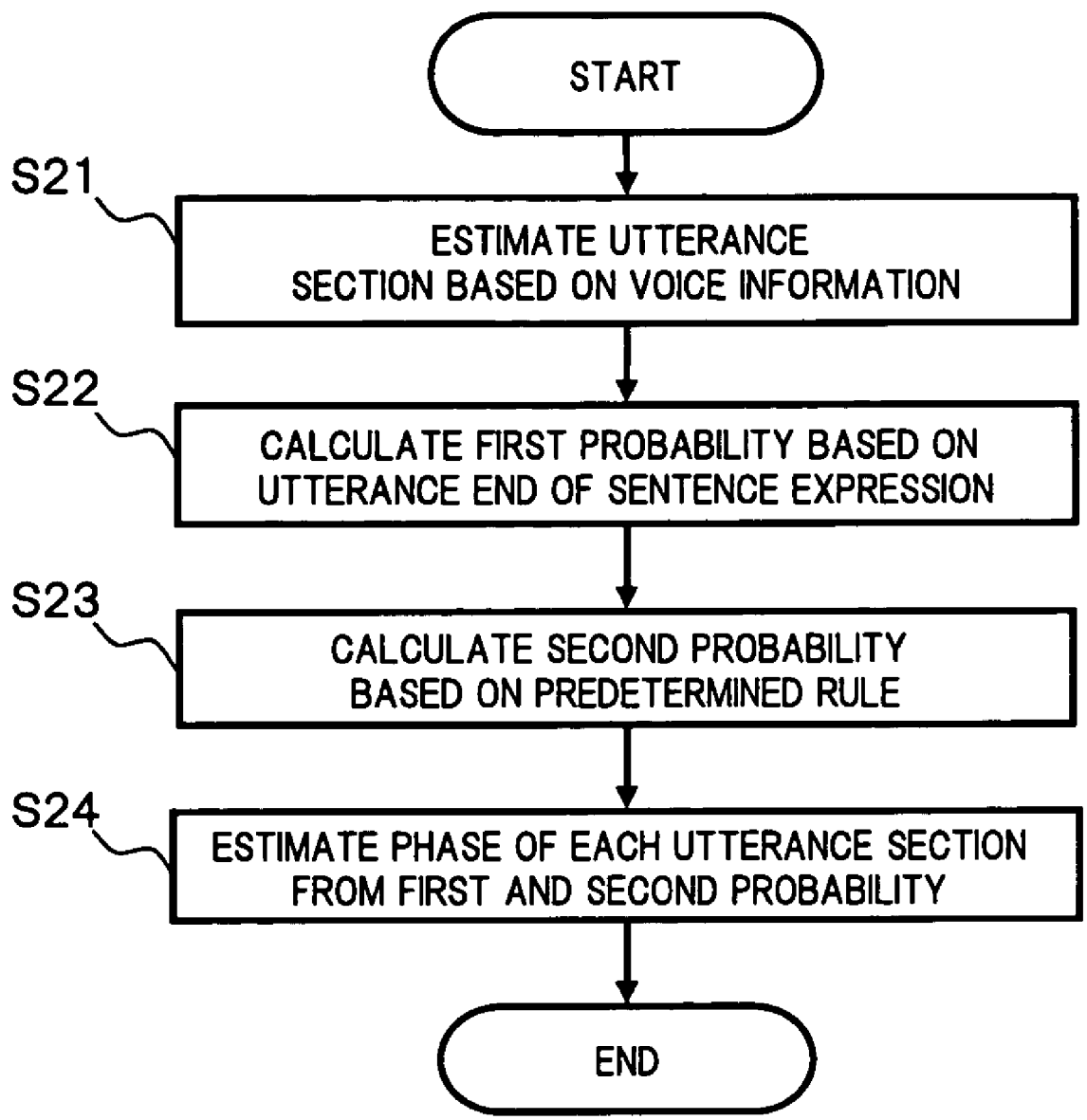
FIG. 17 is a flow chart of a first process of phase dividing processing.

FIG. 17 shows the processing contents of the first division processing.

In step 21, the answer DB 10H is referred to, and speech recognition is performed to the voice associated with the contents of the answer and stored, and a section where utterance lasts (hereinafter referred to as "utterance section) in the answer is estimated. More specifically, at first, of a voiceless section where there is no utterance, an intermediate time of the voiceless section which is shorter than a predetermined value, is estimated as a border delimiting the utterance section, and the utterance section is estimated with a first half section as an utterance before the voiceless section, and with a latter half as a later utterance. Furthermore the speaker is specified by speaker recognition, and the utterance section is estimated with a part where the speaker changes as a border delimiting the utterance section. For the predetermined value, there is the length of the time which becomes a judgment criterion for whether or not the voiceless section is in operation of the agent terminal, and a voiceless portion where the length is greater than the predetermined value, is estimated as a portion where the operation of the agent terminal is being performed.

In step 22, the beginning of the sentence expression of the utterance in the respective utterance sections is extracted using a word spotting method in the speech recognition. Furthermore the key word DB 10O is referred to, and if the speaker of the key word DB 10O and the speaker of the utterance specified by the speaker recognition coincide, and the key word stored in the key word DB 10O and the extracted beginning of sentence expression coincide, then the probability of the respective phases corresponding to the speaker and the key word is extracted as a first probability. At this stage, it should, of course, be appreciated that the probability of respective phases may be estimated and extracted on the basis of diverse kinds of key words contained in an utterance of a speaker other the described beginning of a sentence expression. For example, if a key word of "model number" is contained in the utterance of a given speaker, it may be estimated that the utterance could belong to the phase of so-called "hearing" at a high probability.

In step 23, the rule DB 10P is referred to, and if the characteristic of the respective utterance sections, and the characteristic of the rule DB 10P coincide, the probability of the respective phases corresponding to this characteristic is extracted as a second probability.

In step 24, based on the first probability and the second probability, the phases to which the respective utterance sections belong with the highest probabilities, are respectively specified, and the respective utterance sections are estimated as belonging to the specified phase.

For the phase of the utterance section which does not correspond to the conditions stored in the key word DB 10O and the rule DB 10P, or the phase of the utterance section of the voiceless section which is longer than the predetermined value, this may be estimated based on the phase of the preceding or following section that occurs before or after the utterance section in problem. For example, in a normal answer, the order for the phases is often performed in the order of "hearing", "classification", "retrieving", and "answering". Therefore if the phase of an section immediately before a certain utterance section, is "classification", and the phase immediately after is "answering", then in that utterance section can be estimated to be a phase for "retrieving".

Figure 18:
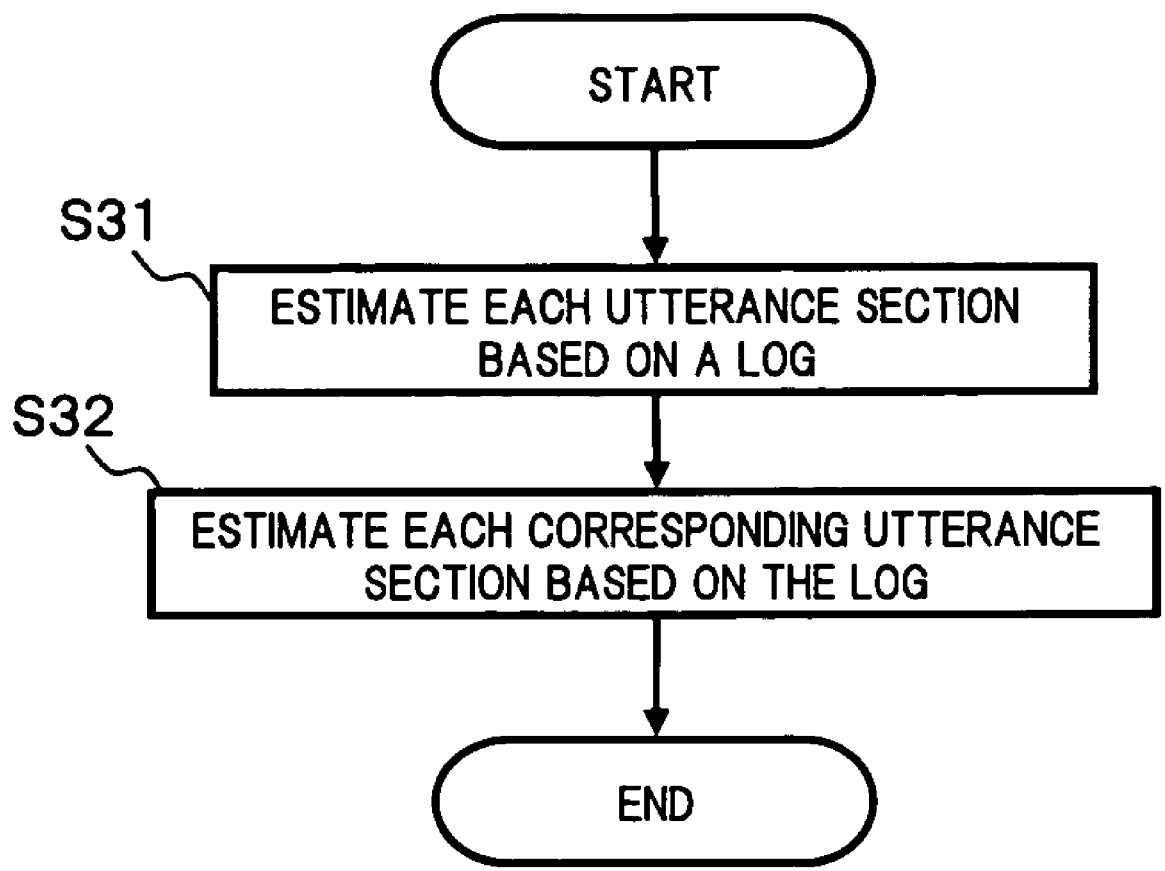
FIG. 18 is a flow chart of a second process of phase dividing processing.

FIG. 18 shows the processing contents of the second division processing.

In step 31, the respective utterance sections in the answer are estimated based on a log which is associated with the contents of the answer and stored, and in which the key operations and the screen transitions of the agent terminals 30 are recorded. More specifically, the respective utterance sections are estimated, with the time where the key input by the agent is finished, or the time where the picture has changed, as a border between the utterance sections.

In step 32, based on the contents entered by the key operation of the agent terminal 30 in the respective utterance sections, and the image contents, which are recorded in the log, then according to a predetermined rule which has been previously determined, the phase to which the respective utterance sections belong is estimated. Here the predetermined rule is for example; if the merchandise type number is entered in a model entry screen of the enquiry object by a key operation, then so that its section is estimated to be a phase of "hearing". Namely, the predetermined rule is associated with the respective phases, and the key operation contents and/or the image contents.

According to this agent training support apparatus, an enquiry pattern is extracted from the enquiry contents in the answer. Furthermore for each of the enquiry patterns, the answers of the respective agents are evaluated. Moreover the contents of the answer of the agent with the highest evaluation are extracted as the model contents of the answer. Then, the model contents of the answer and the contents of the answer of the trainee agent are divided into predetermined phases, and the corresponding phases are mutually compared, and the ineptitude-degree of the trainee agent in the respective phases is calculated. Furthermore, based on this ineptitude-degree, the average ineptitude-degree of the trainee agent in a range of a predetermined time of the model contents of the answer is calculated, and the contents of the range of the predetermined time in which the average ineptitude-degree is the highest is used to generate the teaching material.

Therefore, for each enquiry pattern, by generating teaching material specialized for the contents where the trainee agent is inept, for this trainee agent, it is possible to have emphasized individual training for the inept contents of the trainee agent. Consequently, agent training efficiency is improved.

Furthermore, for each enquiry pattern, the average answer time of the respective agents is calculated, and amongst the answers of the respective agents, the one with the highest average answer time is extracted as the representative contents of the answer for that agent. Furthermore the representative contents of the answer of the agent with the highest evaluation value are extracted as the model contents of the answer. Then, when the ineptitude-degree of the trainee agent in the respective phases is calculated, the model contents of the answer and the representative contents of the answer of respective trainee agents are compared. In this manner, when the ineptitude-degree is calculated by using the representative answer content, in a condition where the influence due to the difference in adequacy among the answers of respective agents is minimal, the ineptitude-degree of each trainee agent in the respective phases is calculated, and thus, the ineptitude-degree becomes a value with high reliability.

Furthermore, by using teaching material with the contents of the answer of the agent with the highest evaluation as the model contents of the answer, the cost of preparing the teaching material is kept down.

Figure 19:
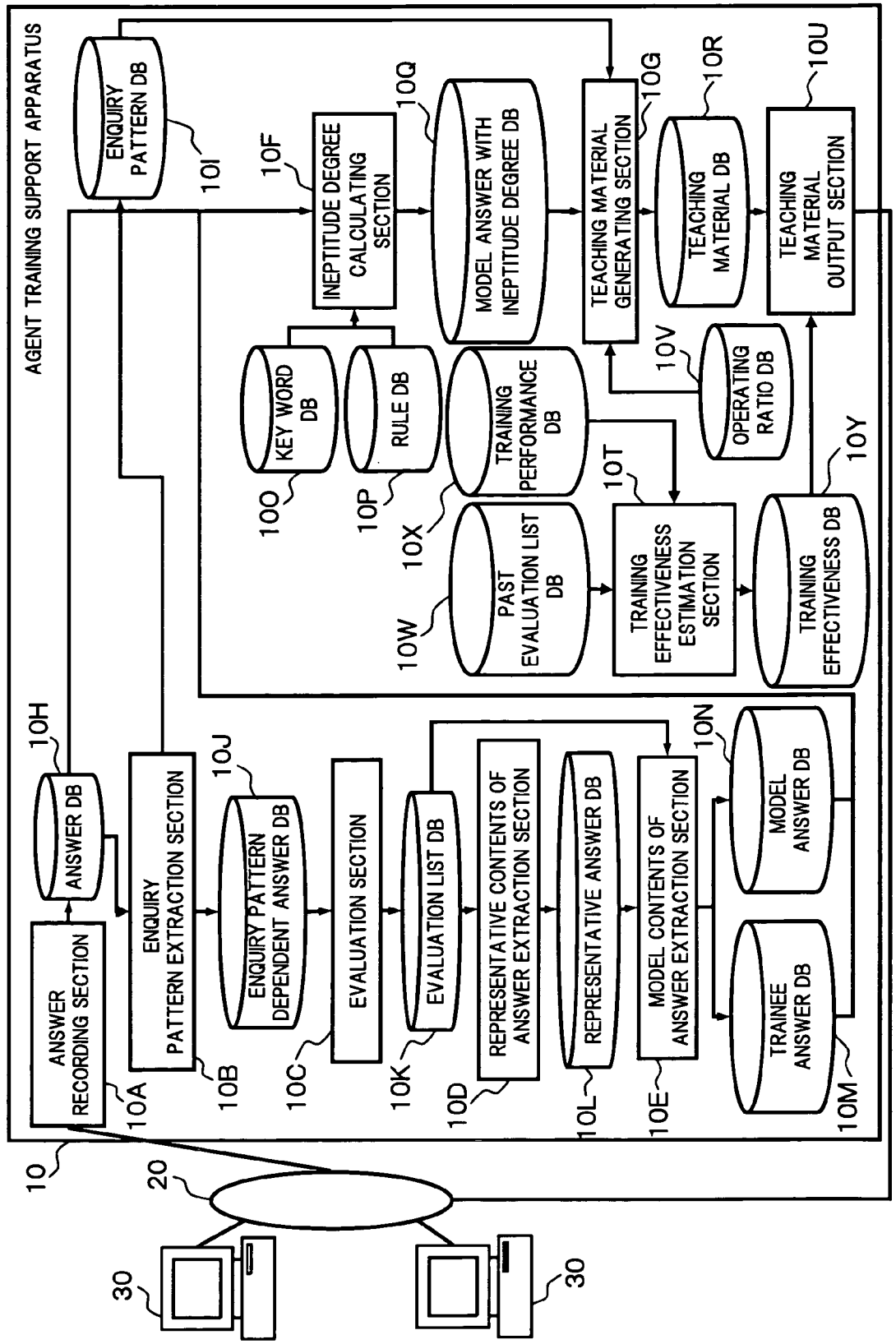
FIG. 19 is an overall block diagram of an agent training support apparatus of a second embodiment in which the present invention is realized.

FIG. 19 shows a second embodiment of an agent training support apparatus according to the present invention.

In the second embodiment, a training effectiveness estimation section 10T, a teaching material output section 10U, an operating ratio DB 10V, a past evaluation list DB 10W, a training performance DB 10X, and a training effectiveness DB 10Y are added to the configuration of the first embodiment.

The training effectiveness estimation section 10T functions as a step and means for estimating the training effectiveness. Based on a growth rate corresponding to the teaching material output frequency and a change in an evaluation for a trainee agent, and the latest evaluation of the trainee agent, it estimates the training effectiveness for this trainee agent. The teaching material output section 10U functions as a step and means for outputting teaching material, and outputs teaching material to the agent terminal 30 of the trainee agent.

The operating ratio DB 10V is stored the operating ratio of the trainee agent for each class (here explanation is made with the day of the week as an example) related to the time or term where there is a correlation with the operating ratio such as the seasons, or the month, or the day of the week, and for each time zone which is punctuated by a predetermined rule. As shown in FIG. 20, the record comprises; the trainee agent ID, the day of the week, the time zone, and the operating ratio. The past evaluation list DB 10W is stored for each enquiry pattern, past evaluations other than the most recent evaluation is registered to thereby grasp the change in the evaluation of the trainee agent. As shown in FIG. 21, the record comprises the trainee agent ID, and evaluation values in the respective enquiry patterns. The training performance DB 10X is stored the teaching material output frequency with respect to a trainee agent, for each enquiry pattern. As shown in FIG. 22, the record comprises the trainee agent ID, and the teaching material output frequency. The training effectiveness DB 10Y is stored training effectiveness due to output of teaching material to the trainee agent, for each enquiry pattern. As shown in FIG. 23, the record comprises the trainee agent ID, and the training effectiveness.

Figure 24:
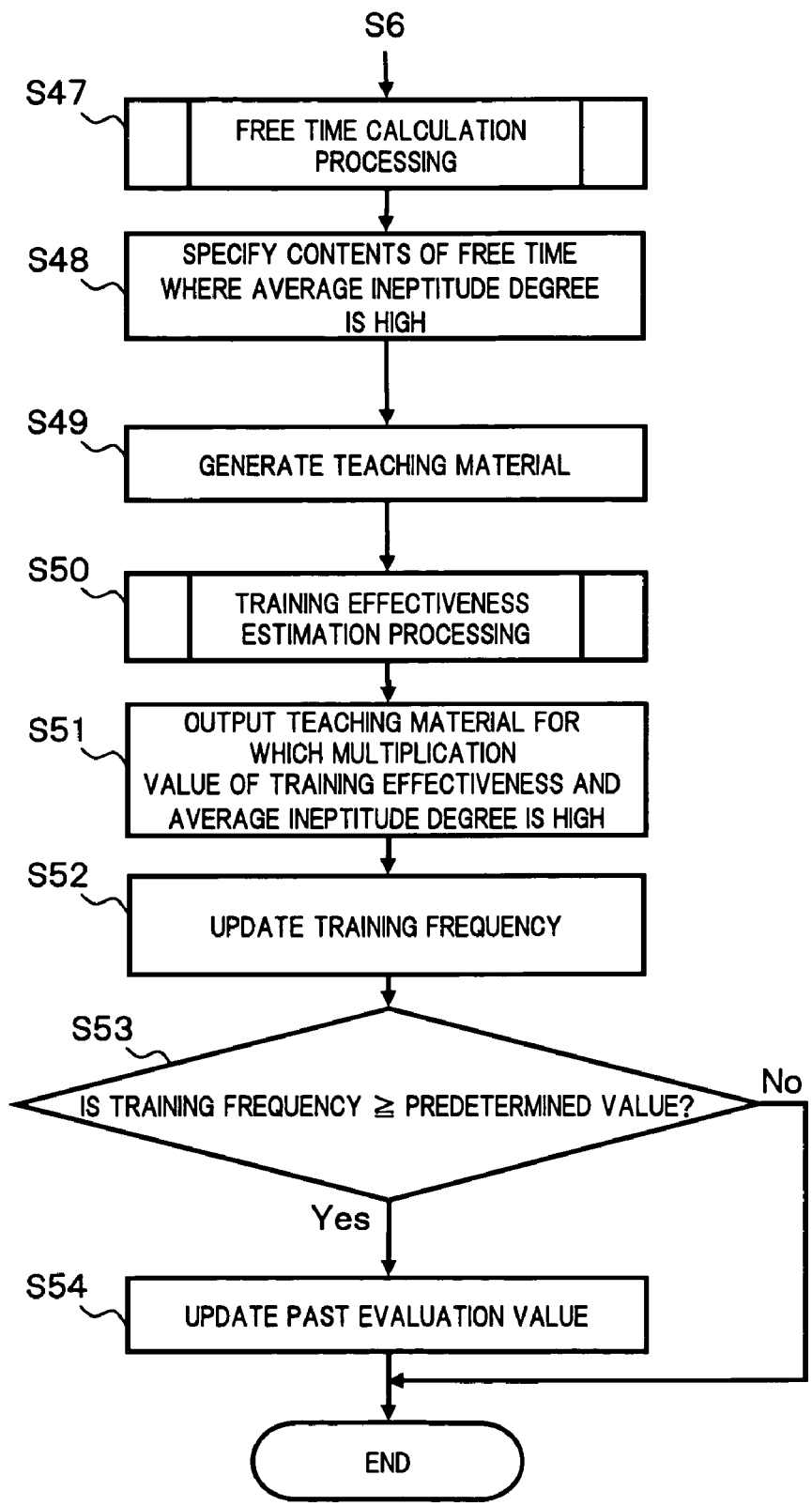
FIG. 24 is a flow chart of training material generation and output processing of the second embodiment.

FIG. 24 shows the processing contents executed in the enquiry pattern extraction section 10B, the evaluation section 10C, the representative contents of the answer extraction section 10D, the model contents of the answer extraction section 10E, the ineptitude-degree calculation section 10F, the teaching material generating section 10G, the training effectiveness estimation section 10T, and the teaching material output section 10U, of the agent training support apparatus 10. The processing of steps 41 to 46 is the same as the processing of the respective steps 1 to 6 in the first embodiment. Therefore the description is omitted here, and the description is for step 47 and thereafter.

In step 47, a subroutine for free time calculation processing for calculating the free time between an answer and a following answer thereto, where teaching material can be provided to the trainee agent, is called for each of the trainee agents.

In step 48, for each enquiry pattern, a range of contents of the answer which includes therein at least one part of the phases where the ineptitude-degree is high, and lasting a predetermined time, is specified from the model contents of the answer, based on the ineptitude-degree information for the trainee agent. This processing is the same as for the processing of step 7 in the first embodiment, however, in the second embodiment, the predetermined time is the length of the free time calculated by the free time calculation processing.

In step 49, teaching material is generated for each enquiry pattern. This processing is the same as the processing of step 8.

In step 50, a subroutine for training effectiveness estimation processing for estimating the training effectiveness for the trainee agent, and storing this in the training effectiveness DB 10Y is called for each enquiry pattern, and for each trainee agent. The training effectiveness estimation processing corresponds to the step and means for estimating the training effectiveness.

In step 51, for the respective trainee agents, teaching material for the enquiry pattern in which the multiplication value of; the training effectiveness in the respective enquiry patterns stored in the training effectiveness DB 10Y by the training effectiveness estimation processing, and the average ineptitude-degree of the teaching material stored in the model answer DB 10N, is extracted from the model answer DB 10N, and preferentially outputted to the terminal which the respective trainee agents are using. Here in the case where there is a plurality of teaching materials with the highest values, either one may be output based in a previously determined rule. The processing of step 51 corresponds to the step and means for outputting teaching material.

In step 52, for each enquiry pattern, the teaching material output frequency to the respective trainee agents, in the training performance DB 10X is incremented.

In step 53, for each enquiry pattern, it is determined whether or not the teaching material output frequency to the respective trainee agents, in the training performance DB 10X exceeds a predetermined value. When this exceeds the predetermined value, the flow proceeds to step 54 (Yes), while when this does not exceed the predetermined value, the processing is terminated (No).

In step 54, for each enquiry pattern, the evaluation value of the respective trainee agents, of the past evaluation list DB 10W is updated by the latest evaluation value.

Figure 25:
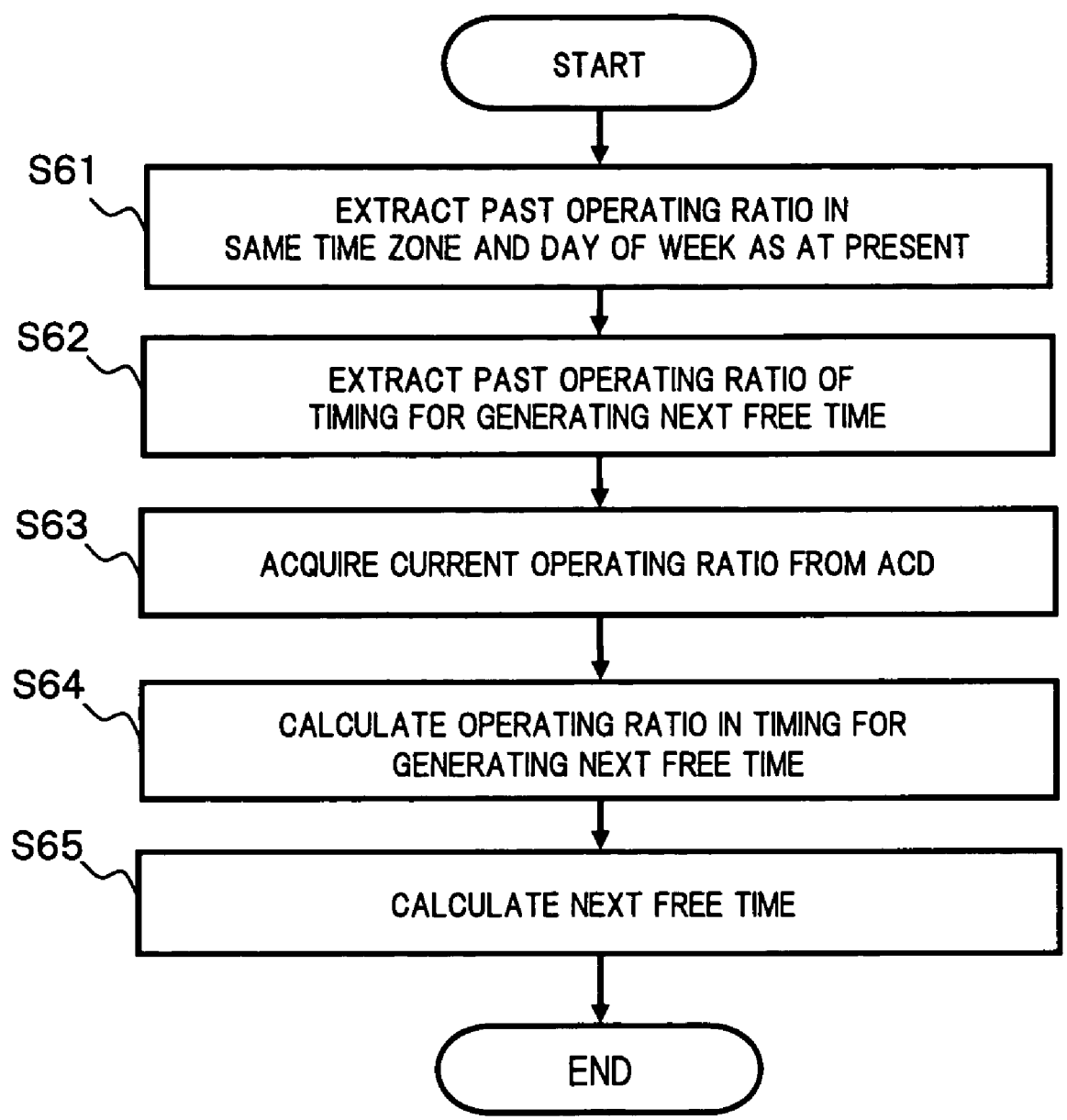
FIG. 25 is a flow chart of free time calculation processing.

FIG. 25 shows the processing contents of a subroutine for free time calculation processing. Here the description is carried out with the processing for calculating the free time which is expected to be generated next, as an example.

In step 61, the operating ratio DB 10V is referred to, and the past operating ratio of the trainee agent in the day of the week and in the same time zone which has been delimited by the predetermined rule, which are the same as at present, is extracted.

In step 62, the operating ratio DB 10V is referred to, and the past operating ratio in the same day of the week and in the same time zone as the free time which is expected to be generated next for the trainee agent is extracted. The free time which is expected to be generated next may be set beforehand after a predetermined time lapse from the present, and may be calculated corresponding to the current operating ratio which can be acquired from the ACD.

In step 63, the current operating ratio of the trainee agent is acquired from the ACD.

In step 64, the operating ratio in a timing in which it is expected that the next free time will be generated for the trainee agent is calculated. This operating ratio is calculated by multiplying a value where the past operating ratio for the same time zone and the same day of the week as the timing at which it is expected that the next free time will be generated, is divided by the past operating ratio of the same time zone and the same day of the week as at present, by the current operating ratio.

In step 65, the next free time for the trainee agent is calculated from the following equation. It should be appreciated that the unit time $T_0$ defined in the next equation, is a time interval which is punctuated by a predetermined rule.

$$T_f \approx \{(T_0 - T_0 \times T_r) \times T_a\}/T_0 \times T_r \approx (1 - R_p)/R_p \times T_a$$

where $T_f$ is Free time, $T_0$ is unit time, $T_r$ is operating ratio for timing where next free time is expected to occur, $T_a$ is average answer time, and $R_p$ is operating ratio.

Figure 26:
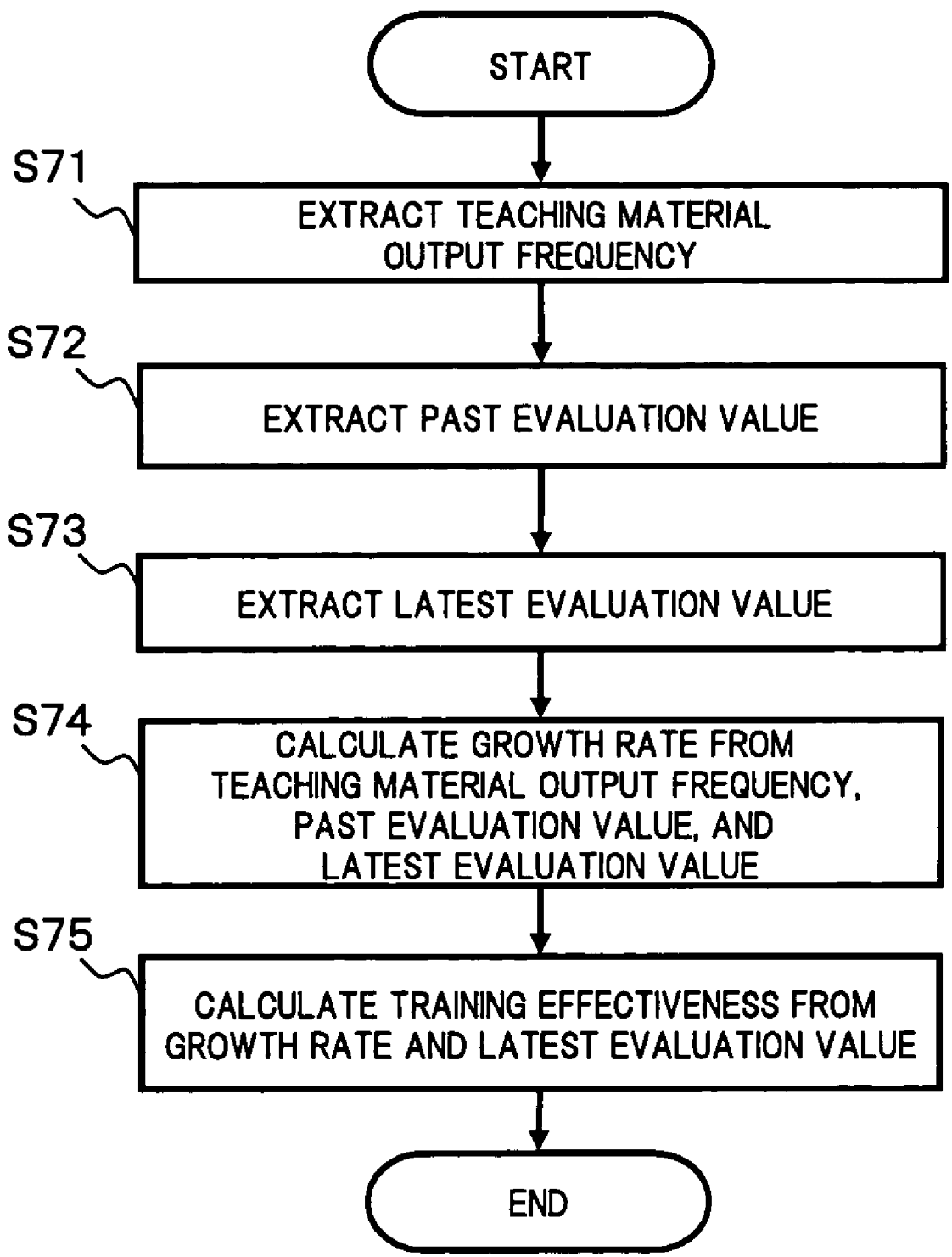
FIG. 26 is a flow chart of training effectiveness estimation processing.

FIG. 26 explains the processing contents of a subroutine for training effectiveness estimation processing.

In step 71, the training performance DB 10X is referred to, and the teaching material output frequency is extracted.

In step 72, the past evaluation list DB 10W is referred to, and the past evaluation value is extracted.

In step 73, the evaluation list DB 10K is referred to, and the latest evaluation value is extracted.

In step 74, the growth rate of the trainee agent is calculated based on the teaching material output frequency, the past evaluation value, and the latest evaluation value. The growth rate can be calculated by dividing a value for where the past evaluation value is subtracted from the current evaluation value, by the teaching material output frequency. However, in the case where the teaching material output frequency is zero, or in the case where the latest evaluation value is lower than the past evaluation value, the growth rate becomes a determined constant (for example zero).

In step 75, the training effectiveness for the trainee agent due to outputting of the teaching material is calculated based on the growth rate and the latest evaluation value. The training effectiveness can be calculated, for example, by subtracting from the growth rate, a value where the latest evaluation value is multiplied by an adjustment variable. Furthermore, the calculated training effectiveness is stored in the training effectiveness DB 10Y.

According to this agent training support apparatus, based on the operating ratio of the trainee agent, the free time of the trainee agent for each time zone is estimated. Moreover, teaching material of the same length as this free time is generated, and when the answer of the trainee agent is finished, this teaching material is outputted to the agent terminal 30 of the trainee agent. Therefore, model contents of the answer for the unskilled part to be used in the free time can be provided to the trainee agent, so that it is not necessary to deliberately prepare a time for training, and training of the trainee agent can be carried out efficiently.

Furthermore, for each enquiry pattern, the growth rate is calculated based on the teaching material output frequency and the change in the evaluation, with respect to the trainee agent, and based on this growth rate and the latest evaluation, the training effectiveness is estimated. Then, teaching material of an enquiry pattern where the multiplication value of the training effectiveness and the average ineptitude-degree of the teaching material is high, is preferentially outputted from the plurality of the teaching material. Therefore, by outputting teaching material with a high training effectiveness, and for which the trainee agent is inept, then within a limited teaching time, training can be performed using in a concentrated manner teaching material which is estimated to be most necessary and most effective for the trainee agent. Consequently, the training effectiveness can be further improved.

In the present invention, for the trainee agent, all of the agents can be the object of the training, or as necessary only a specific agent can be the object of the training.

In the foregoing description, there has been described of the preferred embodiments of the present invention. However, it should be understood that many variations and modifications will occur to a person skilled in the art without departing from the scope and spirit of the present invention as claimed in the appended claims.

I claim:

1. A non-transitory computer-readable recording medium having recorded therein an agent training support program for executing on a computer the steps for:

associating an agent identifier, and enquiry contents and contents of the answer, to sequentially store these in a storage device, when each agent has been performing an answer in a contacting center;

extracting an enquiry pattern from the enquiry contents;

executing evaluation of the answers of each agent based on the agent identifier and the contents of the answer, for each said enquiry pattern;

extracting the contents of the answer of an agent with a highest said evaluation as model contents of the answer, for each said enquiry pattern;

dividing the model contents of the answer and the contents of the answer of a trainee agent into predetermined phases, for each said enquiry pattern;

executing mutual comparison of corresponding phases of said model contents of the answer and said contents of the answer of a trainee agent, to calculate ineptitude-degrees in the respective phases of the trainee agent, for each said enquiry pattern;

specifying from said model contents of the answer, a range of contents of the answer containing therein at least one of the phases where said ineptitude-degree is high, and lasting for a predetermined time, for each said enquiry pattern; and generating teaching material for training the trainee agent, using said model contents of the answer for the range of said predetermined time;

wherein the agent training support program further comprises the step for estimating training effectiveness for a trainee agent, based on a teaching material output frequency for a trainee agent, a growth rate corresponding to a change in an evaluation, and a latest evaluation of the trainee agent, and wherein the delivering step comprises outputting of the teaching material with priority that for which the trainee agent is inept, and that for which said teaching effectiveness is high, from amongst a plurality of training material.

2. A non-transitory computer-readable recording medium having recorded therein an agent training support program according to claim 1, wherein the dividing step divides said model contents of the answer and said contents of the answer of a trainee agent, respectively, based on voice information.

3. A non-transitory computer-readable recording medium having recorded therein an agent training support program according to claim 1, wherein said dividing step divides said model contents of the answer and said contents of the answer of a trainee agent based on log information recorded with key operation and screen transition of a computer terminal, respectively.

4. A non-transitory computer-readable recording medium having recorded therein an agent training support program according to claim 1, wherein the agent training support program further comprises the step for delivering said teaching material as an output to a terminal that a trainee agent uses.

5. A non-transitory computer-readable recording medium having recorded therein an agent training support program according to claim 4, wherein the range specifying step comprises estimating of free time from an operating ratio of an agent in respective time zones which are punctuated by predetermined rules, to determine the length of this free time as a predetermined time, and the teaching-material-delivering step comprises outputting of the teaching material when an answer of a trainee agent is finished.

6. A non-transitory computer-readable recording medium having recorded therein an agent training support program according to claim 1, wherein said model contents of the answer and said contents of the answer of a trainee agent are those having an answer time closest to an average answer time of the respective agents, from amongst a plurality of said contents of the answer belonging to respective enquiry patterns.

7. A non-transitory computer-readable recording medium having recorded therein an agent training support program according to claim 1, wherein the answer-evaluating step evaluates the answers of the respective agents based on a value for where the answer time of the respective agents is subtracted from the average answer time of all of the agents, and the subtraction value is divided by the variance of the average answer times.

8. A non-transitory computer-readable recording medium having recorded therein an agent training support program according to claim 7, wherein said answer time is the average answer time of the respective agents.

9. An agent training support method for executing in sequence on a computer, comprising the steps for:

associating an agent identifier, and enquiry contents and contents of the answer, to sequentially store these in a storage device, when each agent has been performing an answer in a contacting center;

extracting an enquiry pattern from the enquiry contents;

executing evaluation of the answers of each agents, based on the agent identifier and the contents of the answer, for each said enquiry pattern;

extracting the contents of the answer of an agent with a highest evaluation as model contents of the answer, for each said enquiry pattern;

dividing the model contents of the answer and the contents of the answer of a trainee agent into predetermined phases, for each said enquiry pattern;

executing mutual comparison of corresponding phase of the model contents of the answer and the contents of the answer of a trainee agent, to calculate ineptitude-degrees in the respective phases of the trainee agent, for each said enquiry pattern;

specifying from said model contents of the answer, a range of contents of the answer of a predetermined time containing therein at least one of the phases where said ineptitude-degree is high, and lasting for the predetermined time, for each said enquiry pattern; and generating teaching material for training the trainee agent, using the model contents of the answer for the range of the predetermined time;

wherein the agent training support method for executing in sequence on a computer further comprising the step for estimating training effectiveness for a trainee agent, based on a teaching material output frequency for a trainee agent, a growth rate corresponding to a change in an evaluation, and a latest evaluation of the trainee agent, and wherein the delivering step comprises outputting of the teaching material with priority that for which the trainee agent is inept, and that for which said teaching effectiveness is high, from amongst a plurality of training material.

10. An agent training support method for executing in sequence on a computer according to claim 9, wherein the dividing step divides said model contents of the answer and said contents of the answer of a trainee agent, respectively, based on voice information.

11. An agent training support method for executing in sequence on a computer according to claim 9, wherein said dividing step divides said model contents of the answer and said contents of the answer of a trainee agent based on log information recorded with key operation and screen transition of a computer terminal, respectively.

12. An agent training support method for executing in sequence on a computer according to claim 9, further comprises the step for delivering said teaching material as an output to a terminal that a trainee agent uses.

13. An apparatus for supporting training of an agent, the apparatus being suitable for being operated in association with a computer, comprising:

means for associating and sequentially storing agent identifier, enquiry contents and contents of the answer, when an answer has been being performed by each agent in a contacting center;

means for extracting an enquiry pattern from the enquiry contents;

means for executing evaluation of the answers of each agent based on the agent identifier and the contents of the answer, for each said enquiry pattern;

means for extracting the contents of the answer of an agent with a highest evaluation as model contents of the answer, for each said enquiry pattern;

means for dividing said model contents of the answer and said contents of the answer of a trainee agent into predetermined phases, for each said enquiry pattern;

means for mutually comparing corresponding phase of the model contents of the answer and the contents of the answer of a trainee agent, and calculating ineptitude-degrees in respective phases of the trainee agent, for each said enquiry pattern;

means for specifying from said model contents of the answer, a range of a contents of the answer of a predetermined time containing therein at least one of the phases where said ineptitude-degree is high, and lasting for the predetermined time, for each said enquiry pattern; and means for generating teaching material for training the trainee agent, using the model contents of the answer for the range of the predetermined time;

wherein the apparatus for supporting training of an agent further comprising means for estimating training effectiveness for a trainee agent, based on a teaching material output frequency for a trainee agent, a growth rate corresponding to a change in an evaluation, and a latest evaluation of the trainee agent, and wherein the delivering means comprises means for outputting of the teaching material with priority that for which the trainee agent is inept, and that for which said teaching effectiveness is high, from amongst a plurality of training material.

14. An apparatus for supporting training of an agent, according to claim 13, wherein the dividing means divides said model contents of the answer and said contents of the answer of a trainee agent, respectively, based on voice information.

15. An apparatus for supporting training of an agent, according to claim 13, wherein said dividing means divides said model contents of the answer and said contents of the answer of a trainee agent based on log information recorded with key operation and screen transition of a computer terminal, respectively.

16. An apparatus for supporting training of an agent, according to claim 13, further comprising means for delivering said teaching material as an output to a terminal that a trainee agent uses.

* * * * *